March 29, 1938.  W. C. WYLAND  2,112,259
EGG GRADING MACHINE BY WEIGHT
Filed Oct. 24, 1934   4 Sheets-Sheet 1

Inventor
W. C. Wyland
by Hazard and Miller
Attorneys.

March 29, 1938. W. C. WYLAND 2,112,259
EGG GRADING MACHINE BY WEIGHT
Filed Oct. 24, 1934 4 Sheets-Sheet 2
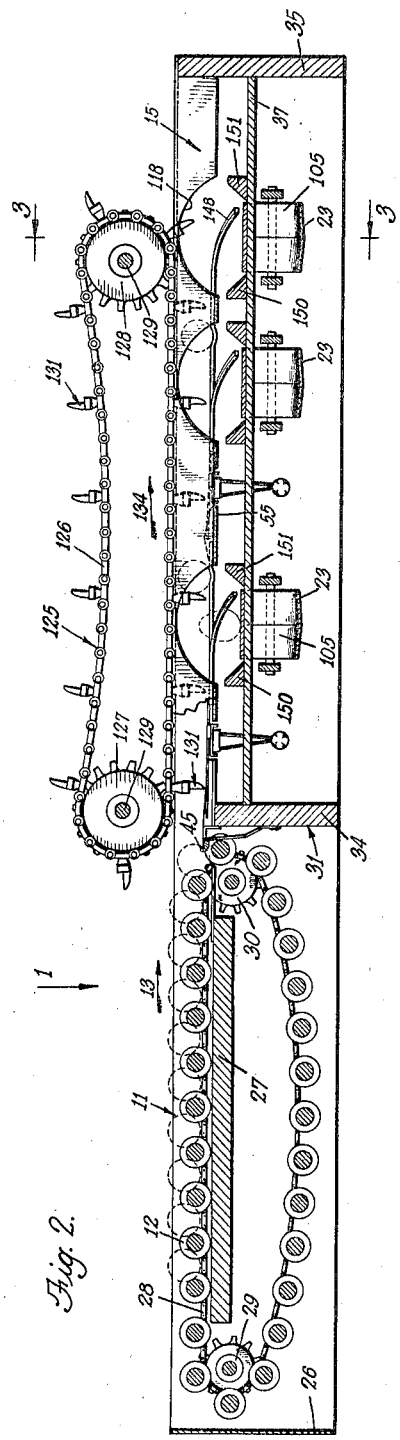
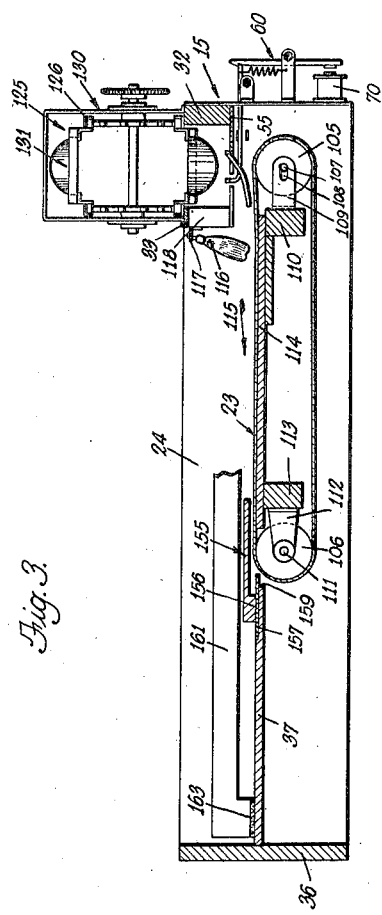
Inventor
W.C. Wyland
by Hazard and Miller
Attorneys.

March 29, 1938. W. C. WYLAND 2,112,259
EGG GRADING MACHINE BY WEIGHT
Filed Oct. 24, 1934 4 Sheets-Sheet 3

Inventor
W. C. Wyland
by Hazard and Miller
Attorneys.

March 29, 1938.　　　W. C. WYLAND　　　2,112,259
EGG GRADING MACHINE BY WEIGHT
Filed Oct. 24, 1934　　　4 Sheets-Sheet 4
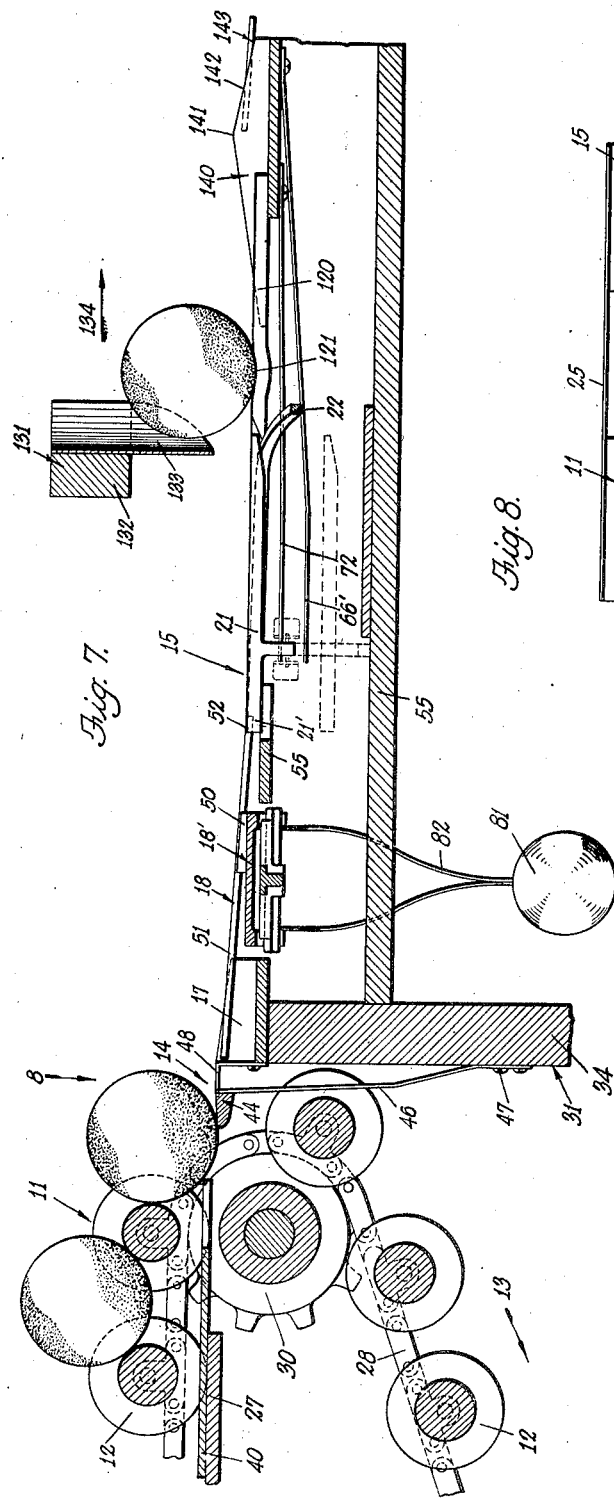
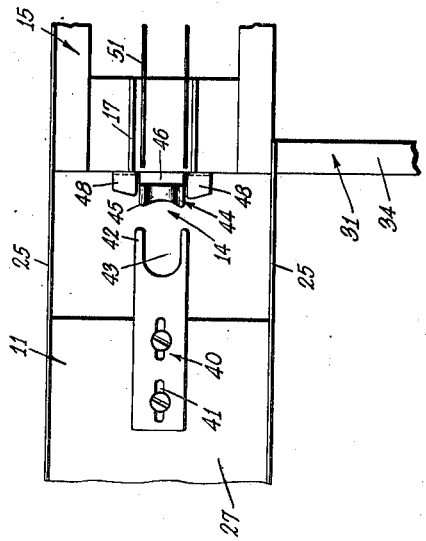
Inventor
W. C. Wyland
by
Hazard and Miller
Attorneys.

Patented Mar. 29, 1938

2,112,259

UNITED STATES PATENT OFFICE 2,112,259

EGG GRADING MACHINE BY WEIGHT

William Chester Wyland, San Gabriel, Calif., assignor to J. W. Wyland & Sons, Los Angeles, Calif., a corporation of California Application October 24, 1934, Serial No. 749,766

18 Claims. (Cl. 209—121)

My invention relates to a type of machine in which eggs are graded, sorted and separated into bins for packing automatically in accordance with the weight of the egg. My invention may be considered as an improvement or further development of the patent to J. W. Wyland, Egg sizing machine by weight, No. 1,728,463, September 17, 1929, in which the control of the device for dumping the eggs was electrically controlled.

The present machine involves improvements in the feeding or transfer of the eggs from a feeding mechanism to the weighing part of the machine, over the above mentioned patent.

My invention is also an improvement over the patent for Egg sizing machine by weight, John W. Wyland, Patent Number 1,954,164, dated April 10, 1934, this latter patent involving the control of the dumping device by mechanical action of the weighing scale.

The present machine also involves improvements in the transfer of eggs from a roller conveyor to the egg grading machine by weight, disclosed in my patent application Serial Number 693,608, filed October 14, 1933, Egg candling and sizing machine, patented February 16, 1937, No. 2,070,980.

The present machine diverges from the previous Wyland patents in a number of features, one of the improved features being the device for transferring eggs from a roller feed conveyor onto the weighing part of the machine and substantially directly onto the weighing runway, and this involves what may be termed an overhead type of feed or pushers for the eggs when traveling on the weighing runway.

The present machine also involves a considerable improvement in the device for diverting the eggs from the weighing runway after having caused a depression of a scale weighing beam.

My present invention, as to the first named feature of the transfer of eggs has for an object to reduce the distance of drop or downward roll of an egg at the end of the infeed roller conveyor at its place of transference to the weighing and grading part of the machine.

One of the main features of my invention as to the transference of eggs involves a construction employing a bridging piece on which the eggs are partly supported between the roller infeed conveyor and the weighing runway whereby when an egg at its time of transfer rolls slightly ahead of the concave feed roll onto the bridging piece, and this is shoved by the same feed roll onto the weighing runway, thus is given an impetus whereby it rolls by gravity on such runway before being engaged by the feeding slat of the grading part of the machine. This feature of my invention reduces the impact of the egg against the bridging piece, reduces the distance the egg must be lowered at this point and also reduces the initial velocity of the egg onto the weighing runway and eliminates the impact of the egg against the feeding slats of the weighing conveyor. These features all reduce the danger of egg breakage and effect a more gentle handling of the eggs at the point of transference. The new arrangement also provides for a more uniform presentation of the eggs to the weighing scale resulting in faster and more accurate weighing of the eggs.

Another improvement resides in employing what may be termed overhead type of pushers for the eggs on the weighing runway in contra-distinction to pushing slats which feed the eggs from the bridging piece onto the weighing runway and in which the latter travel upwardly on the bridging piece.

A further feature of the present type of overhead feed is in employing an endless chain with pusher slats shaped to engage the eggs, this being synchronized with the roller feed conveyor whereby the eggs have a time of free rolling on the weighing runway before being engaged by these pusher slats.

A secondary feature of the transfer feeding mechanism lies in using a resilient center portion of two forward bridging pieces, the purpose of which is to absorb the slight impact of the eggs against the bridging piece through the flexure of a spring and also to reduce the gap between the bridging piece to less than the least diameter of the feed rolls, this being due to the partial closure of the gap under the spring action.

Another feature of my invention resides in the concave feed roller itself in passing the bridging piece causing a depression or retraction of the spring giving sufficient room for the feed roll at the end of its travel to move downwardly and thus follow a lower path to the infeeding end of the conveyor. This spring is adjusted as to strength so that the weight of the egg will depress the center portion allowing the egg to rest on four points comprised of two fixed projecting points at the side of a forward bridge and two projecting points on a rearward bridge. This four point support in conjunction with the pressure exerted on the egg by the concaved feed roll tends to cause and maintain a proper position of the egg with its long axis transverse to the direction of movement thereby causing the egg to roll uniformly and in a straight direction on the weighing tracks, thus promoting an increased speed and accuracy in the weighing portion of the machine.

Another main important feature of my invention relating to the operation of the weighing mechanism for the eggs has a point of distinction from the prior patents mentioned in that the roller of the roller feed for eggs in discharging an egg also pushes the egg onto the fixed track of the weighing runway on which it rolls downwardly by gravity, and the weight is then transferred to the tracks on the scale; and this is done without the egg being engaged by one of the pusher slats on the endless pusher of the weighing machine.

Another object and feature of my invention in connection with the weighing mechanism is in reducing the amount of the drop of the egg from the weighing runway to the storage bins. Further, in substantially requiring the eggs to be removed from the weighing runway by engaging a moving belt which transfers each egg on being dumped from the dump track.

Another important distinction is that the dumping portion of the track operates on a pivot parallel to the weighing runway and thus the eggs are dumped laterally instead of in a longitudinal direction of movement. This comprehends having one rail of track fixed and the second rail arranged to move downwardly, and also to assure that the eggs are fed to the moving depositing belt, a laterally and downwardly curved switching track is utilized to engage each egg when it is dumped to a distributing belt.

Another object and feature of the present invention resides in the construction of the weighing runway with a depression located beyond each section of dumping track so that an egg comes to rest in this depression and is then moved by a pusher up an inclined section of the main runway and then released by gravity down an inclined section to a weighing scale. Thus the eggs are uninfluenced by the pusher slats while on the weighing scale.

As regards the control of the dumping track by the weighing scale having a track thereon, this is somewhat similar to Patent No. 1,728,463 above mentioned, in principle, but differs in construction and omits a bridging piece between the end of the scale and the section of the dumping track. Moreover, the single movable dumping rail is returned to its position for transferring eggs by means of a retraction spring and is then held by a trigger. This trigger is electrically released through a current initiated by the weighing scale when depressed by an egg passing thereover. A spring gives the movable rail a slight downward movement prior to an egg resting thereon so that the trigger cannot again latch the rail in its initial position. The rail is then depressed by the weight of an egg which slides laterally onto the transfer belt.

Another detailed feature relates to having an overlap in the fixed portion of the weighing runway track and a resilient extension of the track on the weighing scale. These are so arranged that the weight of the egg is gradually transferred from the fixed track to the track on the scale without an impact on the scale.

Another feature of my invention relates to the transfer belt depositing the eggs onto the surface of the bins substantially on the same level or plane, the belt operating in a slot in the surface of the bin, and in order to prevent eggs lodging at the discharging end of the belt at the end of the slot I employ angular deflectors which thrust the egg off one side of the transferring belt before it reaches the downwardly moving portion of the belt at the end of the slot in the bin.

My invention is illustrated in connection with the accompanying drawings, in which:

Fig. 2 is a longitudinal section on the line 2—2 of Fig. 1 in the direction of the arrows.

Fig. 3 is a transverse section on the line 3—3 of Figs. 1 and 2 in the direction of the arrows.

Fig. 7 is an enlargement of a portion of Fig. 2 adjacent the transfer position of the feeding conveyor, the first scale and the first section of the dump track, certain of the parts being indicated diagrammatically.

Fig. 8 is a partial plan taken in the direction of the arrow 8 of Fig. 7, omitting the feeding conveyor.

Figure 1:
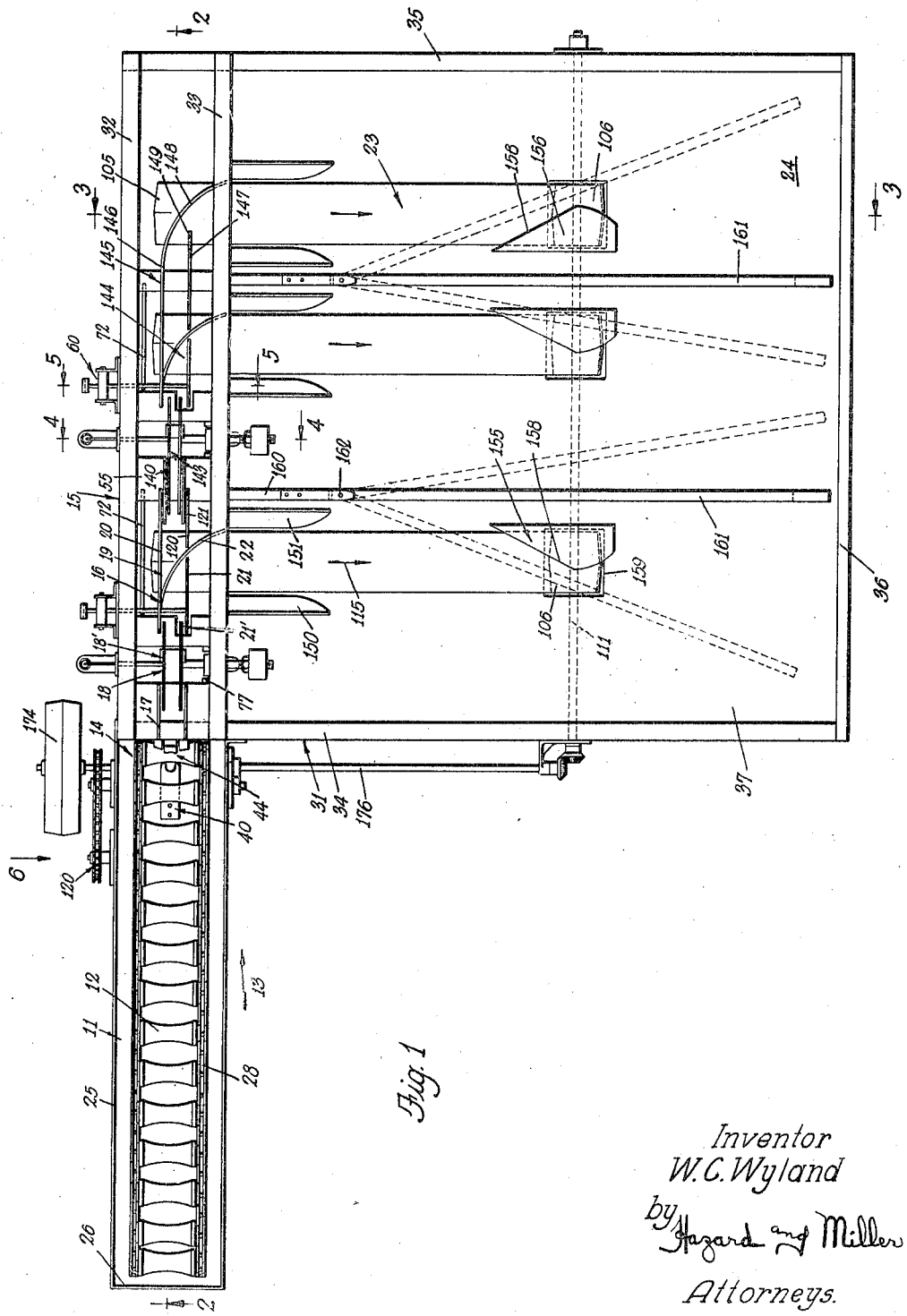
Fig. 1 is a plan of the machine taken in the direction of the arrow 1 on Fig. 2.

Referring first to the general construction of Figs. 1, 2 and 3, the feed portion of the machine is designated generally by the numeral 11, this having a series of feed rolls 12 which move in the direction of the arrow 13. The eggs are transferred at the transfer point 14 to the main portion 15 of the egg grading machine. This employs a weighing runway 16 in the form of a series of tracks divided into stationary rail sections 17, movable track sections 18 mounted on scales 18', dumping track sections 19 having a fixed rail 20, and a tilting rail 21, and switching or diverting rails 22. The eggs when dumped are discharged onto distributing belt type of conveyors designated by the assembly numeral 23, from which they are discharged into the storage bin or compartment 24. Thus, by the above mentioned general construction, the eggs are fed by the roller conveyor 12, are transferred at the position 14 onto the fixed track 17, rolled by gravity onto the track 18 of the scale 18', and then by sufficient weight, cause the operation of the dumping rail 21 to discharge the eggs onto the distributing belt 23 and thus discharging into the bins 24.

The particular set-up of framing, or the like, for the machine is immaterial, but for the feeding portion 11 I show a frame having side members 25 and 26, and a table 27 on which the rolls or spools 12 may travel should it be desired to rotate the eggs. This roller conveyor has chains 28 on opposite sides in which the rollers are journaled, these rollers being formed with a contracted central neck, thus being somewhat spool-shaped. The chains operate over sprockets 29 and 30. The framing structure for the feeding mechanism is attached to the frame 31 having the weighing scales and track assembly and also having the storage bins and distributing belts mounted therein. This frame utilizes longitudinal beams 32 and 33, cross walls 34, 35 and an end wall 36. The floor 37 forms the bottom of the bins on which the eggs are discharged.

The transfer mechanism at the transfer portion of the machine utilizes a tongue 40 having a slot and screw connection 41 to the table 27 over which the spools carrying the eggs pass. This tongue has a pair of prongs 42 with a recess 43 therebetween at its outer end. A bridging piece 44 has a pair of projecting knubs 45 and is resiliently mounted on a leaf spring 46 which is attached at 47 to a cross wall 34. (Note Figs. 1, 7 and 8.) There are a pair of supporting shoulders 48 fixedly secured to the cross wall 34 one on each side of the bridging piece 44 and the spring 46.

In the action of transferring the eggs which are each supported on two adjacent rolls or spools, as the spools pass downwardly at the end of the tongue 40, the egg has a downward movement or roll and engages on the bridging piece 44, and this being resiliently mounted, may give slightly under the impact of the egg and thus reduces the danger of the egg breaking. Should the clearance between the end of the tongue and the bridging piece be insufficient for the downward passage of a spool, the spool engages a spring 46 and thrusts this towards the cross wall 34. The roll which immediately follows the egg gives the egg a thrust onto the fixed track 17 of the weighing runway 16. Immediately before this thrust takes place, the egg is supported on the two prongs 42 and either the knubs 45 of the bridging piece which is resiliently mounted, or the two shoulders 48. Thus the egg is supported at four points and is straightened by the feeding roll so that its long axis is directly transverse to the weighing track or runway 16. When the egg moves out of contact with the prongs 42 it either has contact with the knubs 45 or the shoulders 48 and thus rolls without a side twisting on the fixed track 17 of the weighing runway.

The transfer of the eggs gradually from the fixed track section 17 to the track section 18 on the weighing scale 18' is arranged by having the track supported on a fixed support 50 on the scale and having resilient projecting ends 51 which are located between the rails of the track 17. Moreover, the fixed track 17 has a slightly steeper slope than the movable track 18 so that the eggs roll by gravity onto the scale and are discharged at the discharge end 52 of the movable track 18 onto the dumping section 19. This dumping section is arranged by having the fixed rail 20 preferably supported on a metal strip 55 secured to the under edge of the longitudinal beams 32 and 33 and by having the tilting rail 21 mounted on a supporting arm 56 which is pivoted at 57 to a bracket 58 attached to a side plate 59 depending from the beam 32. The releasing trigger assembly 60 utilizes a bracket 61 secured to the plate 59 and employs a trigger 62 pivoted at 63 to this bracket. This trigger has a notch 64 to engage the end of the arm 56 and has a wedge-shaped tip surface 65. A retraction spring 66 connects between the arm 56 and the bracket 61 and provides the main force for elevating the tilting rail 21 into its latched position. However, a spring 66' secured to the under side of the beam 32 is engaged by the arm 56 when it tilts downwardly, and after the egg is released, gives an initial upward impulse to the arm 56.

The trigger is released by an electro-magnet 70 illustrated as mounted on the plate 59, which when energized, retracts the armature 71 on the end of the trigger, thus releasing the arm 56 to tilt downwardly when an egg rests on the rails 20 and 21; but as the trigger is released prior to an egg resting on these rails, a leaf spring 72 attached to the under side of the beam 32 gives an initial downward movement of the tilting rail 21 and prevents a relatching of the trigger and relatching of the arm 56. The arm 56 therefore, in effect, operates between the two springs 72 and 66'. (Note Fig. 5.) The trigger is reset by a spring 62'.

Figure 5:
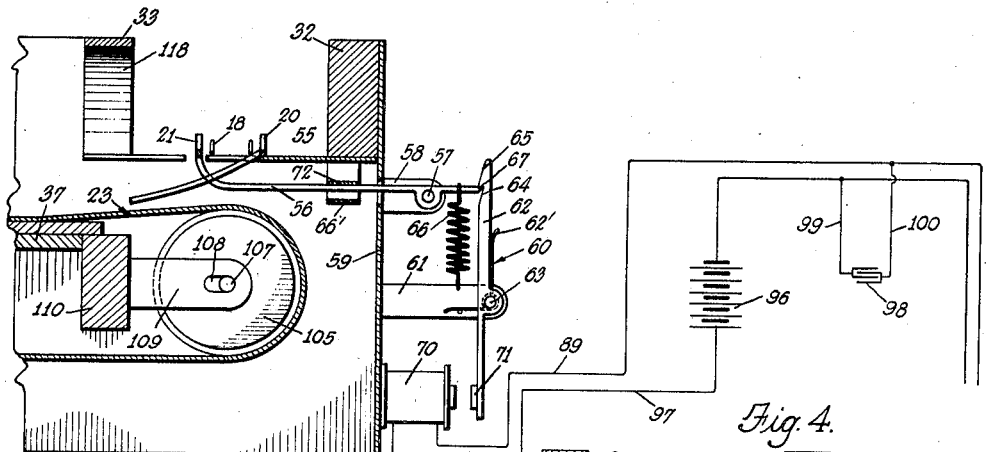
Fig. 5 is a transverse section on the line 5—5 of Fig. 1 in the direction of the arrows showing a portion of the dumping track and distributing belt with part of the electrical connections.
Figure 4:
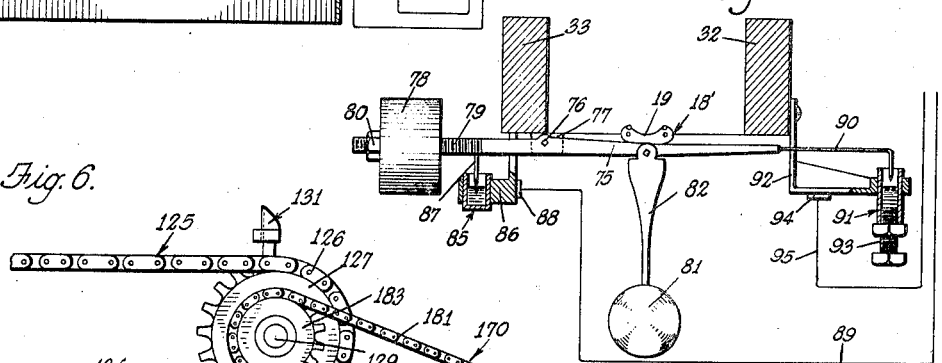
Fig. 4 is a transverse section on the line 4—4 of Fig. 1 in the direction of the arrows showing a portion of the weighing scale and part of the electrical connections.

The construction of the scale and the electrical connections for energizing the magnet are illustrated in connection with Figs. 4 and 5. The weighing scale 18' is mounted on a scale beam 75 which is illustrated as pivoted at 76 substantially below the side beam 32 on bracket 77 secured to this beam. A counter-weight 78 is mounted on threads 79 of the scale beam and may be adjusted and locked in place by the lock nut 80. A pendulum weight 81 is suspended by an arm 82 from the scale beam. The electrical connections comprise a mercury cup 85 supported by an insulated bracket section 86 depending from the beam 33 and the beam 75 has a pin 87 forming a constant contact with the mercury in the cup. A terminal 88 is connected to the mercury in the cup and from this there is an electric lead 89, one end of which is connected to one end of the electro-magnet winding coil. The electric circuit through the scale beam 85 employs an angularly bent pin 90 which dips into a mercury cup 91 with a plug 93 supported on a bracket 92 connected to the beam 32. The bracket is insulated but has a terminal 94 in an electric circuit with the mercury in the cup and from this terminal there is a lead 95 which connects with a source of power 96 and employs a continuing lead 97 to the other end of the magnet coil. A condenser 98 is connected by leads 99 and 100 to the opposite leads 89 and 95. Thus, when an egg tilts the scale downwardly, it causes the finger 90 to contact with the mercury in the cup 91 and thus establishes a current which energizes the magnet 70, and as above described, even should the scale beam swing upwardly and de-energize the magnet before the egg passes onto the track section 19 having the fixed rail and the tilting rail 21, the arm 56 cannot become latched.

The egg is dumped and discharged by the following mechanism. When the tilting rail 21 tilts downwardly the end of the egg thus tilts down and at the same time the switching or diverting rail 22 which is curved transversely from the fixed rail 20 around the end of the tilting rail 21 brings the lower end of the egg into contact with the transfer belt 23. This transfer belt operates over pulleys 105 and 106. The pulley 105 has its axle 107 adjustably mounted in a journal slot 108 in a bracket 109 connected to a block 110 attached to the under side of the floor 37 of the bin 24. (Note Figs. 3 and 5.) The other pulley 106 is secured to a shaft 111, such shaft being journaled in brackets 112 secured to a block 113 located below the floor 37. Thus the upper run 114 of the transfer belt which operates in the direction of the arrow 115 carries the eggs in a transverse direction of the weighing track. When these eggs are dumped they are slightly retarded by a curtain 116 suspended from a bracket 117 on the beam 33, which beam has cut-out sections 118 to allow the eggs when dumped to pass through such cut-out sections.

An egg which is too light to actuate the first weighing scale and hence is carried by rolling by gravity on the dumping truck section 19 on the rails 21 and 20 and the fixed rail 120, rolls into a retarding or depressed section 121 of the track formed by the fixed rails 20 and 120. These rails have a slight depression illustrated in Figs. 2 and 7.

A pusher feeder 125 then comes into action on an egg but not until the egg is passed over the first scale 18' and the dumping track section 19. This pusher feeder employs two endless chains 126, each passing over a sprocket 127 at one end and 128 at the other end. These sprockets are mounted on shafts 129 journaled in a frame structure 130 which may be of any suitable character and is mounted on the side beams 32 and 33. Extending between the two chains there are pusher slats 131, each of which employs preferably a wood strip 132 and a curved metal plate or pusher strip 133 depending therefrom so that as the lower run of the endless chains operates in the direction of the arrow 134, (note Figs. 2 and 7), the egg retarded in retarding track section 121 is engaged by a pusher slat. This egg is then pushed upwardly on a hump track section 140 until it reaches the apex 141, (note Fig. 7), when the egg rolls by gravity downwardly on the fixed track section 142 which is the equivalent of the sloping fixed track section 17, from which it rolls by gravity onto the wire tracks mounted on the second weighing scale assembly designated by the assembly numeral 143. (Note Fig. 1), and if this egg is of sufficient weight to actuate the scale it is dumped by the second dumping track section designated by the assembly numeral 144 of Fig. 1, and is carried sidewise by a second transfer belt. It is obvious that I may employ as many scales and tilting and discharging track sections as are necessary to secure the desired number of grades or sortings of eggs in accordance with their weight, but the use of two of these in the drawings is sufficient to illustrate the principle of construction and operation.

Eggs which are too light to operate any of the scales and thus form the last series of eggs to be graded are pushed by a pusher slat along the fixed track section 145 which extends beyond the second tilting track 144, and this employs fixed rails 146 and 147. The rail 146 has a laterally and downwardly curved section 148, the end extending downwardly towards the last transfer belt 23 and the fixed rail 147 terminating at 149 sufficiently spaced from the curved rail 148 to permit the egg to tilt downwardly into contact with the last transfer belt and thus to be moved sideways.

In connection with the transfer belts I employ guard strips 150 and 151, each preferably being formed of wood slats somewhat triangular in section as shown in Fig. 2 and secured to the floor 37 of the bins 24. Adjacent the discharge end of each transfer belt there is a deflector plate 155, each plate being attached as indicated at 156 (note Figs. 1 and 3), to a metal attaching plate 157 secured to the floor 37. These deflecting plates thus extend over the upper run of each transfer belt 23 and have a diverting edge 158 which thrusts the eggs sideways and thus off the belt at the end of its run. This prevents lodging of the eggs at the end 159 of the slot formed in the floor 37 to accommodate the movement of the belt 23 as it passes from above the floor 27 at its upper run to its lower run below the floor.

A series of individual bins is provided by utilizing fixed short partition sections 160 located between each pair of transfer belts, and to these fixed sections there are movable partition sections 161 pivoted at 162 and having a contact end 163 engaging the upper surface of the floor 37. These partition sections 161 thus provide a space and if desired, the movable section of the partition may be pressed sideways over the deflecting plates 155 and the upper run of the transfer belts 23. This movable section of the partition is to provide accommodation for an increased delivery of eggs by any one of the transfer belts 23 and to provide for enlarging or decreasing the size of any individual bin.

Figure 6:
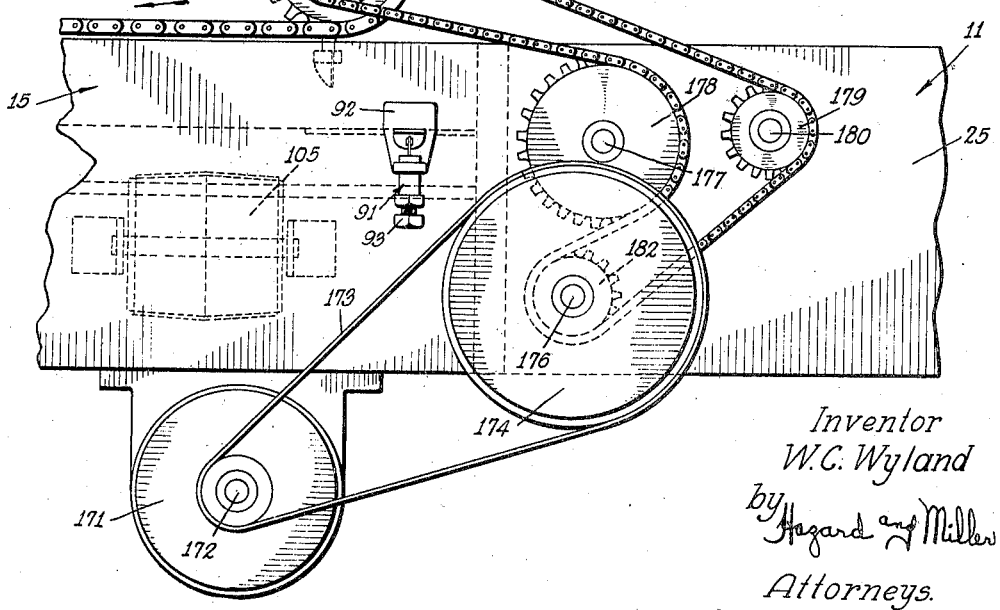
Fig. 6 is an enlarged side elevation taken in the direction of the arrow 6 showing a portion of the drive mechanism.

The drive mechanism for the various moving parts of the machine is as follows, having reference to Figs. particularly 1 and 6, such drive mechanism being designated by the general assembly numeral 170. This employs an electric motor 171 which operates a drive pulley 172 which, by means of a belt 173, actuates a main pulley 174. This pulley is mounted on a shaft 176 which is journaled preferably in the feed portion of the machine and for the sake of convenience, to the side members 25 of such machine. The driving sprocket wheels 30 of the spool conveyor are mounted on a shaft 177 suitably journaled in the sides 25 of the feeding portion of the machine, and on this shaft and on the portion outside of the sides 25 there is a sprocket wheel 178. An idler sprocket wheel 179 is mounted on a stub shaft 180 connected to one of the sides 25 of the feeding portion of the machine and a sprocket chain operates over a drive sprocket 182 on the shaft 176 or connected to the pulley 174. This chain continues and actuates a sprocket wheel 183 on one of the shafts 129 of the pusher feeder 125 and thus actuates the endless chain 126 of this feeder. The direction of rotation of the various pulleys and sprockets, the sprocket chain, and the chain of the pusher feeder is indicated by the arrows in Fig. 6. The speed of translation of the spool conveyor and the pusher slat conveyor is so regulated that the pusher slats of the pusher conveyor 125 move at a higher rate of speed than the individual spools but the speed is so regulated and the pusher slats so positioned that the eggs will be delivered by the roller conveyor and roll downwardly by gravity over the first scale, and the first tilting track lodged in the first retarding or depressed section 121 of the track before the pusher slat engages such retarded egg, and also the speed of the endless chain pusher mechanism 125 must be such that an egg in rolling by gravity on the track approaching a scale platform and over the tracks of a scale will roll ahead of a slat.

In the operation of the machine, in dumping eggs the arm 56 which supports the tilting rail 21 may be considered as operating between the springs 72 and 66'. When a weighing scale is depressed by an egg which is of the proper weight to cause its action, the trigger is released as above described, the spring 72 gives an initial downward impulse to the arm 56 and the tilting rail 21, thus positively moving the arm 56 so that on return of the trigger under the influence of its return spring 62', such arm 56 cannot become latched. When an egg is received at the tilting section of the track composed of the rails 20 and 21, the tilting rail will swing downwardly and thus transfer an egg to the transfer belt 23, but in this downward movement of the arm 56 it engages a spring 66' which, as soon as the egg is free of the rail 21, gives an initial upward movement to the arm 56 which is continued by the spring 66 until the arm becomes latched by the trigger 62.

It sometimes occurs that two eggs following in succession cause an actuation of the same scale, and that therefore, if the tilting rail after dumping the first egg, becomes latched, the second egg will be carried over to a further grading device when it should have been discharged by the first device. I therefore preferably have the loading end of the tilting rail 21 overlap the discharge end of the movable rail 18 as indicated at 21'; thus the second egg engages the tilting rail before this has time to become latched and allows a depression of this rail due to the weight of the egg. It will be understood that the second egg has caused the automatic release of the trigger by the electro-magnet 70, but this trigger has not had sufficient time to return to its latching position. However, if the second egg is under weight and does not actuate the scale, the trigger only reacts to the impulse of the first or leading egg of the two and has sufficient time to latch the tilting rail before the second or underweight egg reaches such tilting rail, in which case such underweight egg is carried over to a further grading part of the machine for lighter eggs.

Various changes may be made in the details of construction without departing from the spirit or scope of the invention as defined in the appended claims.

I claim:

1. In an egg grading machine, a longitudinally extending runway for eggs, said runway having in one section a weighing scale with a portion of the runway thereon having a downward inclination for eggs to roll by gravity rectilineally over the said scale, another section of the runway adjacent the end of the scale being downwardly tiltable in a lateral direction as to the axis of the runway, means to retain the downwardly tiltable section of the runway in its egg transferring position, means controlled by the actuation of the scale due to the weight of an egg thereon to release the tilting section for dumping an egg, the weight of the egg when on the tilting section causing such section to discharge an egg laterally as to the axial direction of the runway.

2. In an egg grading machine as claimed in claim 1, a transfer conveyor positioned below the tilting section of the runway and engaging an egg when the tilting section tilts downwardly before the egg completely leaves said tilting section, to remove an egg sideways from the runway.

3. In an egg grading machine, the combination of a runway for eggs having a track with a pair of rails, one of said rails being fixed and the other downwardly tiltable, means to normally latch the tiltable rail to form with the fixed rail a track for conveying eggs thereover, a control means actuated by the weight of an egg to release the tilting rail of the track whereby such rail may tilt downwardly due to the weight of the egg to discharge an egg laterally having reference to the axis of the runway.

4. In an egg grading machine as claimed in claim 3, a switching or diverging rail positioned to engage an egg when the tilting rail is tilted downwardly and thus positively force said egg laterally together with a transfer conveyor located below the portion of the runway having the fixed and tilting rails to transfer an egg on dumping sideways from the axis of the runway.

5. In an egg grading machine, the combination of a runway for eggs, a weighing scale forming part of the runway, said runway having a laterally tiltable section tiltable on a pintle located parallel to the axis of the runway, means to positively retain said section of the runway in egg transferring position for an egg to roll thereover, means actuated by the scale to release the said retaining means whereby the tiltable section of the runway may tilt laterally, a transfer conveyor located below the tiltable section of the runway at a position to engage an end portion of an egg when the runway is tilted before the other end of the egg leaves the said runway and thus gradually shift the egg from the runway to the said conveyor.

6. In an egg grading machine, the combination of a runway for eggs having a track with a pair of rails, one of said rails being fixed and the other downwardly tiltable on a pivot axis parallel to the fixed rail, means to normally retain the fixed rail in egg transferring position, releasing means for the said retaining means whereby the tiltable rail may tilt downwardly and a switching rail positioned to engage an egg on the downward tilting of the tiltable rail to divert the egg laterally.

7. In an egg grading machine, a fixed track having a pair of spaced rails with a downward slope for rolling of eggs by gravity with their long axes transverse to the track, a weighing scale having a movable track with a pair of rails thereon, said scale track being in axial alignment with the fixed track and having a downward slope for rolling of eggs by gravity, the slope of the scale track being slightly less than the slope of the fixed track, the rails of the scale track and of the fixed track overlapping whereby the weight of an egg is gradually transferred from the fixed track to the scale track, a tilting track having a fixed rail and a tilting rail, an arm supporting the tilting rail having a pivot parallel to the said latter fixed rail, a latching restraining means to retain the tilting rail in egg transferring position, the said tilting track being located adjacent the lower end of the scale track to receive eggs from the scale, a control means operated by the depression of the scale due to the weight of the egg to release the restraining means for the tilting rail, the tilting rail being movable downwardly by the weight of an egg and a spring means to return the said arm and the tilting rail to normal position to be engaged by the said restraining means.

8. In an egg grading machine, an egg weighing scale having a downwardly sloping track mounted thereon, a tilting track having two rails, at least one of said rails being depressible, an arm connected to the depressible rail and having a pivot parallel to the axis of the tilting track, a movable trigger to normally engage said arm and restrain the arm and the tilting rail from movement, electrical means controlled by the depression of the scale due to an egg thereon to release the said trigger, a spring means engaging the said arm to give an initial movement to the said arm and tilting rail to prevent reengagement of the trigger, a returning spring connected to the arm yieldable due to the weight of an egg on the tilting rail on the dumping of an egg, the said spring returning the said arm into latching relation with the trigger.

9. An egg grading machine comprising in combination, a feeding conveyor having an endless chain with egg supporting spools thereon, an egg receiving track having a fixed section with a downward slope, a resiliently mounted bridging structure positioned to be engaged by an egg in transfer from a spool to the fixed track, a movable weighing scale having a scale track thereon to receive eggs rolling by gravity from the fixed track, a tilting track having a pair of rails, one of said rails being depressible, a restraining means to normally hold the depressible rail in elevated position for transferring eggs thereover, a releasing means for the said restraining means controlled by the scale when depressed due to the weight of an egg on the scale, a transversely movable transfer conveyor positioned to receive an egg when tilted downwardly by the depression of the tilting rail and means to return the tilting rail to its normal position after the transverse movement of an egg on the transfer conveyor.

10. An egg grading machine as claimed in claim 9, a retarding track section located at the end of the tilting rail section to retard an egg, a pushing conveyor having means to engage an egg located at the retarding section and move an egg longitudinally thereover, a section of track having a downwardly and laterally extending switching or diverting rail and a second transfer conveyor located to receive eggs diverted by the said switching rail.

11. In an egg grading machine, the combination of a runway for eggs having a track with parallel rails, one rail being fixed and the other rail being tiltable, the tiltable rail being pivoted on a pivot parallel to the axis of the track, means to normally latch the tiltable rail in a stationary position, a control means to release the latch for downward tilting of the tiltable rail and a diverting means to positively engage an egg rolling on the runway and discharge such egg laterally.

12. In an egg grading machine as claimed in claim 11, the diverting means including a diverting rail having one end located adjacent the fixed rail, said diverting rail passing transversely across the track below the level of the track and beyond the end of the tilting rail.

13. In an egg grading machine as claimed in claim 11, the diverting means including a diverting rail having one end located adjacent the fixed rail, said diverting rail passing transversely across the track below the level of the track and beyond the end of the tilting rail, and a transversely moving belt conveyor having its upper run positioned to engage an egg on the tilting of the tiltable rail.

14. In an egg grading machine as claimed in claim 11, a transversely moving belt conveyor having its upper run positioned below the tilting rail and positioned to engage an egg on the downward movement of the tilting rail and to positively feed the egg laterally from the runway.

15. In an egg grading machine, the combination of a track having a pair of rails, one rail being fixed the other rail being tiltable, the tiltable rail being connected to a pivot parallel to the track, means to normally latch the tiltable rail in a fixed position for transference of eggs on both the tracks, means to release the latch for a downward movement of the tilting rail, and an endless belt having its upper run moving transversely of the track, the upper run being positioned to engage an egg on tilting of a tilting rail and to positively feed the egg transversely from the track.

16. In an egg grading machine, a bin having a floor with a slot, an endless belt having its upper run closely contiguous to the upper surface of the floor and having a reverse turn at its discharge end at the slot, the upper portion of the belt at the slot being substantially level with the floor, a deflector plate secured to the floor and extending over the slot and part of the upper run of the belt, whereby eggs carried by the belt on engaging the deflector plate are positively discharged from the belt prior to the eggs reaching the slot at the reverse turn of the belt, a partition structure having a pivoted section with a free end resting on the floor of the bin, the section between the pivot and the free end being adapted to move transversely over the upper run of the belt and over the deflector plate.

17. In an egg grading machine, a fixed track with a pair of spaced rails having a downward slope for rolling eggs by gravity, a movable weighing scale having a rigid track thereon with resilient ends extending in longitudinal alignment with the fixed track and having a downward slope for the rolling of eggs thereover by gravity, the fixed track and the resilient ends of the track of the scale overlapping and the resilient ends being between the rails of the fixed track whereby eggs are gradually transferred from the ends of the fixed track to the resilient ends of the track on the scale.

18. In an egg grading machine, a fixed track having a pair of spaced rails with a downward slope for rolling of eggs by gravity with their long axes transverse to the track, a movable weighing scale having a rigid track with a pair of rails thereon having resilient ends, said scale track being in axial alignment with a fixed track and having a downward slope for rolling of eggs by gravity, the slope of the scale track being slightly less than the fixed track, the rails of the fixed track and the resilient ends of the rails of the scale track overlapping and the resilient ends being between the rails of the fixed track whereby the weight of an egg is gradually transferred from the fixed to the scale track.

WILLIAM CHESTER WYLAND.